Figure 1:
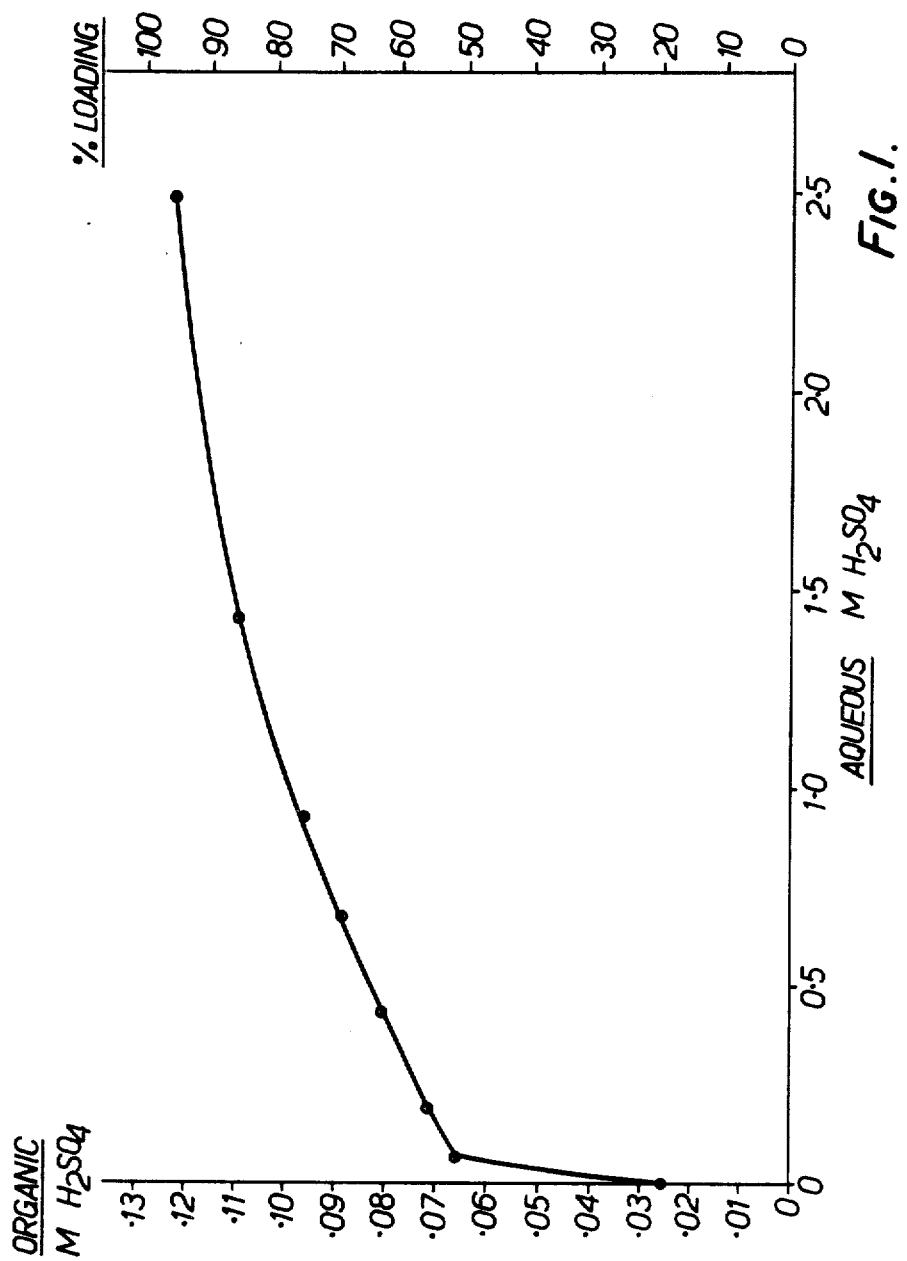

United States Patent [19]

Dain et al.

[11] 4,370,237

[45] Jan. 25, 1983

[54] EXTRACTANTS

[75] Inventors: Richard J. Dain, Crouch, near Borough Green; Gary D. Manning, Welwyn Garden City; Alfred R. Burkin, Shenfield, all of England

[73] Assignee: Ford & Dain Research Limited, Sevenoaks, England

[21] Appl. No.: 193,280

[22] PCT Filed: Oct. 25, 1979

[86] PCT No.: PCT/GB79/00171

§ 371 Date: May 21, 1980

§ 102(e) Date: May 21, 1980

[87] PCT Pub. No.: WO80/00796

PCT Pub. Date: May 1, 1980

[30] Foreign Application Priority Data

Oct. 27, 1978 [GB] United Kingdom ............... 42255/78

[51] Int. Cl.$^3$ .................................................. B01D 11/04
[52] U.S. Cl. .................................................... 210/638

[58] Field of Search ............... 210/634, 638, 648, 670, 210/683

[56] References Cited

U.S. PATENT DOCUMENTS 3,666,446 5/1972 Cook et al. ........................ 210/638

FOREIGN PATENT DOCUMENTS 613392 1/1961 Canada .............................. 210/634

Primary Examiner—Ivars C. Cintins
Attorney, Agent, or Firm—Murray and Whisenhunt

[57] ABSTRACT

An extraction process for extracting ionic values from an aqueous solution containing same which comprises contacting the aqueous solution with an organic hydrophobic liquid extractant phase comprising an extractant for ions, the molecules of which extractant contain at least one hydrophobic group selected from cyclic phosphazene radicals, linear siloxane radicals, cyclic siloxane radicals, and three-dimensional siloxane radicals, and stripping resulting loaded extractant phase with an aqueous stripping liquid phase.

18 Claims, 11 Drawing Figures

EXTRACTANTS

This invention relates to extractants which can be used in liquid systems for extracting ionic values, e.g. metal values or acid values, into an organic phase from an aqueous phase.

Many industrial processes involve the selective extraction of certain components from an aqueous to an organic phase using a suitably chosen extractant in the organic phase, followed by regeneration of the extractant and release of the extracted components.

An example of such a process concerns the recovery of copper from impure copper-bearing materials. It has, for example, been proposed to utilise solvent extraction using a selective organic extractant for copper, such as one of those known under the trade name Lix (e.g. Lix 64 N), typically an oxime-containing hydrocarbon modified by adjacent hydroxyl groups, to extract copper values from an aqueous copper sulphate-containing leach liquor. The copper sulphate is back-extracted from the organic extract with aqueous sulphuric acid to give an aqueous acidic copper sulphate solution, which itself is subjected to a further solvent extraction, using a selective organic extractant for the acid values, preferably an amine such as trioctylamine (a form of which is available under the trade name Alamine 336) in a solvent such as a mixed aromatic/aliphatic type kerosene (commercially available as Escaid 100).

Other industrial processes which may involve the extraction of acids with an organic extractant include the treatment of bleed streams in electrolytic processes, the recovery of waste acid from plating baths, the ilmenite process for the recovery of titanium dioxide, the recovery of magnesium and magnesia from sea-water, the treatment of acid and metal bearing wastes at low concentrations, the purification treatment of zinc electrolytes, the control of acid concentration in solvent extraction plants, the treatment of acid wastes from pickle liquor baths, and the control of acid concentration in electro-winning acid concentration controls where sulphur dioxide is injected into electro-winning cells.

The extractants used in such processes have problems leading to low efficiency in use. Thus, if for example, one considers the use of amine extractants for extracting acid values from an aqueous solution containing, inter alia, acid values or salts of acids, as for example for extraction of acid values from acidic copper sulphate solutions, a material such as trioctylamine can be used as extractant in an organic diluent, preferably with the addition of a minor amount of an alcohol such as isodecanol. Trioctylamine has only a single amino group per extractant molecule. However, it is often necessary, to remove from the aqueous phase relatively large quantities of acid values in the organic flow, per cycle. It is desirable therefore to have an extractant with high carrying capacity defined as: acid extraction per cycle extractant weight per cycle.

This carrying capacity may be increased by increasing the number of amine groups per extractant molecule, to form a diamine or polyamine. Such materials are well known and widely used in polymer industries, an example being 1,6-diaminohexane used in nylon production. In the absence of steric hindrance between adjacent amino groups, such diamines and polyamines will form salts with acids in the usual manner, a diamine extracting two molecules of a monobasic acid, and a triamine three molecules of the same acid, etc. Thus the carrying capacity of a diamine is approximately twice that of a monoamine on a weight for weight basis, where the monoamine contains the same number of carbon atoms.

However the problem of providing a high carrying capacity cannot be solved simply by increasing the number of amine groups. Diamines and polyamines have greater solubility in aqueous liquors than monoamines. In general the greater the number of amine groups present, the more hydrophilic is the amine molecule. This hydrophilicity can to a certain extent be offset by lengthening the hydrocarbon chain to restore adequate water insolubility. However, there is a limit to the extent of chain lengthening which can in practice be carried out, because increase in the number of carbon atoms also increases the viscosity of the molecule and thus decreases the proportion or amount of amine which can be dissolved in a given volume of organic diluent, such as Escaid 100, to maintain acceptable phase disengagement properties after contacting the aqueous and organic phases. Furthermore, the increased chain length of the amine can also impair solubility in the organic phase, although branched chains are better than straight chains in this respect. With branched chain amines, care must be taken in positioning the amine groups if steric hindrance is to be avoided.

There is thus a need to provide improved extractants of ionic values, particularly in the field of extractants of anions or acid values, for use in solvent extraction.

The invention accordingly seeks to provide an improved extraction process for extracting ionic values, such as anions or acid values, from aqueous solutions thereof.

According to the invention there is provided an extraction process for extracting ionic values from an aqueous solution containing same which comprises contacting the aqueous solution with an organic hydrophobic liquid extractant phase comprising an extractant for ions, the molecules of which extractant contain at least one hydrophobic group selected from cyclic phosphazene radicals, linear siloxane radicals, cyclic siloxane radicals, and three-dimensional siloxane radicals, and stripping resulting loaded extractant phase with an aqueous stripping liquid phase.

In a preferred process according to the invention the extractant is an extractant for anions and comprises a cyclic phosphazene which is substituted by one or more non-water-solubilising substituents. Preferably the cyclic phosphazene comprises a cyclotriphosphazene or a cyclotetraphosphazene or a mixture thereof. Preferred phosphazenes are those of the formula:

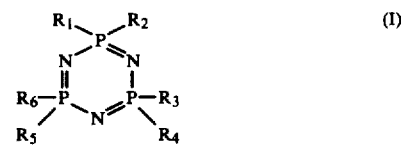
(I)

or of the formula:

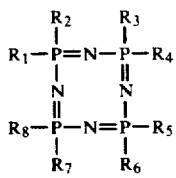

or a mixture thereof,
wherein each of $R_1$ to $R_8$, independently of the others, is selected from halogen, alkyl, alkoxy, aryl, aryloxy, alkylthio, arylthio, —$NR_9R_{10}$, alkoxyalkylene, alkoxyalkyleneoxy, —$NHNR_9R_{10}$, —$NR_9NHR_{10}$, arylalkyl, arylalkoxy, alkylthioalkylene, alkylthio alkyleneoxy, arylthioalkylene, $R_9R_{10}N$—alkylene, $R_9R_{10}N$—alkyleneoxy, $R_9R_{10}N$—arylene, $R_9R_{10}N$—aryleneoxy, and siloxanyl-alkylene radicals, or wherein at least one of the pairs of radicals $R_1$ and $R_2$, $R_3$ and $R_4$, and $R_5$ and $R_6$ together represent the atoms which are required to complete, together with the P-atom to which they are attached, a 5-, 6- or 7-membered saturated or unsaturated, optionally substituted heterocyclic ring, wherein each of $R_9$ and $R_{10}$, independently of the other, is selected from hydrogen atoms, alkyl radicals and aryl radicals or $R_9$ and $R_{10}$ together represent the atoms which are required, together with the N-atom to which they are attached, to form a 3-,4-,5-,6- or 7-membered, saturated or unsaturated, optionally substituted heterocyclic ring, and wherein each of the aforementioned alkyl, alkoxy, alkylene, aryl and siloxanyl radicals may bear one or more non-water-solubilising substituents, provided that $R_1$ to $R_{10}$ are so selected that the compound of formula (I) or (II) is substantially water-insoluble.

As examples of non-water-solubilising substituents there can be mentioned halogen, nitro, alkyl, alkoxy, alkylsulphonyl, alkoxycarbonyl, alkylcarbonyloxy, alkylcarbonyl, aryl, and cyano groups. By the term halogen we mean fluorine, chlorine, bromine and iodine. Chlorine is the preferred halogen substituent. Any alkyl groups present may contain for example from 1 to 20 carbon atoms or more, preferably 1 to 8 carbon atoms. Examples of suitable alkyl radicals include methyl, ethyl, n- and iso-propyl, n-, iso- or t-butyl, n-pentyl, n-hexyl, and n-heptyl radicals as well as homologues and isomers thereof. As examples of suitable aryl radicals there can be mentioned phenyl, p-tolyl, p-nitrophenyl, p-methoxyphenyl, p-bromophenyl, naphthyl-1 and naphthyl-2 and the like as well as the o- and m- isomers thereof. Ethyleneimino, N-morpholino-, N-piperidino and N-pyrryl radicals are examples of heterocyclic radicals of formula —$NR_9R_{10}$.

Excluded from consideration in the process of the invention are such compounds as hexakisethylcyclotriphosphazene, hexakisaminocyclotriphosphazene, hexakismethylaminocyclotriphosphazene, hexakisethylaminocyclotriphosphazene, hexakisdimethylaminocyclotriphosphazene, octakisethylcyclotetraphosphazene, octakisaminocyclotetraphosphazene, octakismethylaminocyclotetraphosphazene, octakisethylaminocyclotetraphosphazene, and octakisdimethylaminocyclotetraphosphazene, since these compounds are all too soluble in water to be useful in the process of the invention.

Amongst preferred compounds of the formula (I) there can be mentioned those wherein at least one of the radicals $R_1$ to $R_6$ is an alkylamino radical and each of the remaining radicals $R_1$ to $R_6$, if any, is an alkyl group. Other preferred compounds of the formula (I) are those wherein at least one of the radicals $R_1$ to $R_6$ is a phenyl radical and each of the remaining radicals $R_1$ to $R_6$, if any, is an alkylamino radical. Compounds worthy of specific mention include hexakis-(n-butylamino)-cyclotriphosphazene, hexakis-(n-heptylamino)-cyclotriphosphazene and n-heptylaminopentaphenylcyclotriphosphazene. Examples of other compounds of the formula (I) and (II) will appear hereinafter.

Amongst other preferred extractants suitable for use in the process of the invention are extractants for anions which comprise at least one primary, secondary or tertiary amino group linked by a divalent organic radical to a linear, cyclic or three-dimensional siloxane radical. Although the invention also contemplates the use of di-, tri- and polyamino substituted siloxanes, especially preferred are monoamino compounds of the formula A-X-B wherein A represents —$NH_2$, —$NHR'$, or —$NR'R''$ wherein $R'$ and $R''$ each, independently of the other, represent an optionally substituted hydrocarbon radical or $R'$ and $R''$ together represent the atoms necessary, together with the N-atom to which they are attached, for forming an optionally substituted heterocyclic ring, X represents a divalent radical and B represents a three-dimensional siloxane radical or a radical of the formula

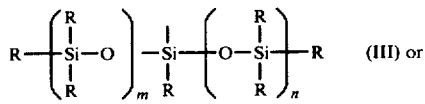

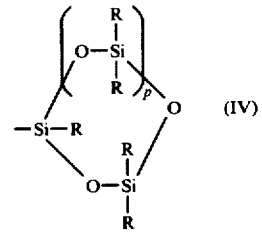

wherein each R, independently of the others, represents alkyl or phenyl, m and n each represent O or an integer and p represents an integer of from 1 to about 6. Preferred groups R are methyl or ethyl groups. $R'$ and $R''$ may represent alkyl groups containing, for example 1 to 20 carbon atoms or more, especially 1 to 6 carbon atoms. Alternatively, when A represents -$NR'R''$, $R'$ and $R''$ can together represent the atoms necessary, together with the N-atom to which they are attached, for forming an optionally substituted heterocyllic ring, such as N-morpholino, N-piperidyl, or the like. It is preferred that X represents an alkylene radical.

The process of the invention can be carried out using conventional solvent extraction equipment, such as conventional mixer-settlers. Each of the extraction and stripping steps may be carried out in one or more stages, with co-current or, preferably, countercurrent flow between stages. In each of the extraction and stripping stages the aqueous:organic phase ratio by volume may vary within wide limits, e.g. from about 100:1 to about 1:100. However, since mass transfer is usually best effected at a phase ratio of between about 2:1 to about 1:2, it will often be necessary to recycle one of the phases within a particular stage from the settler to the mixer in order to promote favourable conditions for mass transfer within the mixer (e.g. about 1:1) despite a disparate feed rate ratio of the phases (e.g. about 50:1) to the mixer of that stage. Such recycle is conventional practice in solvent extraction and is usually known as "internal recycle".

The process of the invention is applicable to the extraction of anions or acid values from aqueous solutions thereof. As examples of such processes there can be mentioned the treatment of bleed streams in electrolytic processes, the recovery of waste acid from plating baths, the reduction of acidity required in the course of the ilmenite process for the recovery of titanium dioxide as well as in the recovery of waste acid from the waste liquors therefrom, the treatment of acid and metal bearing wastes at low concentrations, the purification treatment of zinc electrolytes, the treatment of acid wastes from pickle liquor baths, and the control of acid concentration in electro-winning acid concentration controls where sulphur dioxide is injected into electro-winning cells. Besides extraction of acid values the extraction process of the invention can be used for extraction of metal-containing complex ions, such as uranium-containing complex anions and $CoCl_4''$, from aqueous solutions.

The preparation of cyclotriphosphazenes of the formula (I) and cyclotetraphosphazenes of the formula (II) can be accomplished by known methods, for example by the methods outlined in the book "Phosphorus-Nitrogen Compounds" by H. R. Allcock, published by Academic Press, New York and London (1972) and in the references therein listed or by analogous methods.

The preparation of the siloxane-containing extractants used in the process of the invention, for example those of the formula A-X-B wherein A, X and B are as defined above, can likewise be achieved by known methods, for example by the methods outlined in the book "Organosilicon Compounds" by C. Eaborn, published by Butterworths Scientific Publications, London (1960) and in the references therein listed, or by analogous methods.

For example, the compound hexakis-(n-butylamino)-cyclotriphosphazene can be prepared by reaction of hexachlorocyclotriphosphazene with n-butylamine in benzene solutions. Preparation of the compound (n-heptylamino)-pentaphenylcyclotriphosphazene can be accomplished by treating dichlorophenylphosphine with chlorine gas to give tetrachlorophenylphosphine which is then heated with ammonium chloride in chlorobenzene to give 1,3,5-triphenyl-1,3,5-trichlorocyclotriphosphazene; this latter compound is then refluxed in dry benzene with aluminium chloride to form by the Friedel-Crafts reaction pentaphenylchlorocyclotriphosphazene, which in turn is reacted with n-heptylamine in benzene solution. In either case, in addition to the desired cyclic trimer, some cyclotetraphosphazenes may be produced as by-products. It is not necessary to purify the cyclotriphosphazenes to remove those by-products and in many cases it is satisfactory to use technical mixtures of cyclic phosphazenes rather than pure compounds.

As an example of the preparation of an anion extractant containing a siloxane residue there can be mentioned the compound (4'-aminobutyl)-heptamethyltetrasiloxane. This can be prepared, for example, by reacting hydrido-heptamethylcyclotetrasiloxane with allyl cyanide in the presence of a catalytic amount of hexachloroplatinic acid and reducing the resulting 3'-cyanopropyl-heptamethylcyclotetrasiloxane with lithium aluminium hydride. It is of course well known that siloxane polymers tend to undergo "equilibration" upon heating particularly in the presence of acids or bases. Since the extractants themselves contain a basic group, the siloxane-containing materials contemplated for use in the process of the invention may undergo such equilibration, in which Si-O linkages are continuously broken and reformed until the system reaches an equilibrium condition at the thermodynamically most stable state, either during their formation or afterwards. Hence, although a particular extractant may nominally be assigned, for example, a cyclotetrasiloxane structure, it may in practice include linear siloxane radicals, three-dimensional siloxane radicals (e.g. radicals derived from siloxanes of the type discussed in Chapter 8 of the aforementioned book by Eaborn), and cyclic siloxane radicals containing 3 or more siloxane units.

Besides the extractant the organic hydrophobic liquid extractant phase may also comprise an organic hydrophobic solvent. Typical solvents include hydrocarbons, more particularly paraffins, such as n-hexane, and aromatic solvents, such as benzene, toluene and xylene, and mixtures thereof. Other hydrophobic solvents, which can be used alone or in admixture with hydrocarbons, include esters, such as octyl acetate and ethyl butyrate and the like, chlorinated hydrocarbons, such as ethylene dichloride, carbon tetrachloride, chloroform, and the like, ethers, such as di-n-butyl ether, and mixtures thereof. Essentially any water-insoluble solvent can be used provided that the extractant has sufficient solubility therein. Preferred solvents include commercially available mixed hydrocarbon solvents such as Escaid 100 and the like. In certain cases it may be desirable to include a minor amount of a more polar solvent, such as a long chain alcohol, e.g. iso-decanol, in the solvent in order to improve its solubilising power for the extractant.

Since siloxanes are generally very mobile liquids it is possible that by suitable tailoring of the siloxane moiety of the extractant molecule it may be unnecessary to utilise any solvent.

The concentration of the extractant in the solvent (if any) is generally selected so as to give an organic hydrophobic liquid extractant phase of readily pumpable viscosity, whilst minimising the risk of precipitation of the extractant through variation in ambient temperature due to its solubility limit being exceeded.

The aqueous stripping phase used in the process of the invention in many cases can be water. Alternatively there can be used an aqueous liquor containing a concentration of the ionic species to be stripped less than that which would be in equilibrium with the loaded organic phase to be stripped.

The process of the invention can also be used for cationic, especially metal ion, extraction from aqueous solution. In this case the extractant is an extractant for metal ions and comprises at least one metal ion complexing group linked by means of a divalent radical to a hydrophobic group selected from linear siloxane radicals, cyclic siloxane radicals, and three-dimensional siloxane radicals. Although it is within the scope of the invention to utilise extractants containing two or more metal ion complexing groups, preferably the extractant comprises a compound of the formula E-Y-F wherein E represents a metal ion complexing group, Y represents a divalent organic radical and F represents a three-dimensional siloxane radical or a radical of the formular (III)

or (IV) as defined above. In such compounds -Y- typically represents an alkylene radical containing, for example, 1 to about 20 carbon atoms or more. As examples of alkylene radicals there can be mentioned methylene, ethylene, butylene, and homologues thereof as well as isomers thereof. Extractants suitable for extraction of copper ions by the process of the invention include, for example compounds of the formula

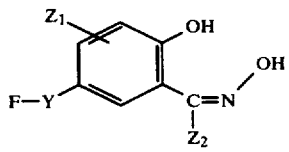

(V)

wherein F represents a radical of the formula (III) or (IV), -Y- represents an alkylene radical, $Z_1$ represents hydrogen or a non-water-solubilising substituent (as exemplified above), which preferably stands in ortho-position to the -OH group, and $Z_2$ represents an alkyl or cyclic aromatic radical which may bear one or more non-water-solubilising substituents (as exemplified above). Preferably $Z_1$ represents hydrogen or chlorine. $Z_2$ is preferably an optionally substituted phenyl radical or a (preferably branched) long chain alkyl radical containing, for example, at least four carbon atoms up to about 20 carbon atoms or more, such as a $C_8$ to $C_{12}$ alkyl radical, e.g. dodecyl. A specific example of a compound of this type is the compound of formula (V) wherein $Z_1$ represents hydrogen, $Z_2$ represents phenyl, Y is 1,3-propylene and F is a heptamethylcyclotetrasiloxanyl radical (i.e. a radical of formula (III) wherein R is methyl and p is 2).

When the extractant used in the process of the invention contains a siloxane (siloxanyl) radical, such radical is bound to the phosphazene group or to the amino or metal ion complexing group or groups by means of a divalent radical (such as optionally substituted alkylene, alkylene-oxy-alkylene or phenylene) attached to the siloxane (siloxanyl) radical by a silicon-carbon bond. Thus the term "siloxanyl radical" is used herein to designate a radical bound by means of a direct silicon-carbon bond (e.g. pentamethylcyclotrisiloxanyl) and radicals bound by means of a silicon-oxygen-carbon bond (i.e. siloxanyloxy groups) are excluded from consideration.

The invention will be further explained with reference to FIGS. 1 to 10 of the accompanying drawings which show distribution curves for the following materials:

| FIG. No. | Organic phase | Aqueous phase |
|---|---|---|
| 1 | 5.00% w/v Alamine 336 in 10.00% w/v iso-decanol in Escaid 100 | aq. $H_2SO_4$ |
| 2 | 4.95% w/v Alamine 336 in 9.67% w/v iso-decanol in Escaid 100 | aq. HCl |
| 3 | 5.10% w/v Alamine 336 in 9.88% w/v iso-decanol in toluene | aq. HCl |
| 4 | 5.03% w/v HBCTP in 10.2% w/v iso-decanol in toluene | aq. $H_2SO_4$ |
| 5 | 5.10% w/v HBCTP in 10.1% w/v iso-decanol in toluene | aq. HCl |
| 6 | 5.06% w/v HHCTP in 9.9% w/v iso-decanol in toluene | aq. $H_2SO_4$ |
| 7 | 5.07% w/v HPPCTP in 10.0% w/v iso-decanol in toluene | aq. $H_2SO_4$ |

-continued

| FIG. No. | Organic phase | Aqueous phase |
|---|---|---|
| 8 | 5.12% w/v HPPCTP in 10.1% w/v iso-decanol in toluene | aq. HCl |
| 9 | 5.12% w/v BAHMCTS in 10.09% w/v iso-decanol in toluene | aq. $H_2SO_4$ |
| 10 | 5.04% w/v BAHMCTS in 9.92% w/v iso-decanol in toluene | aq. HCl |

Figure 2:
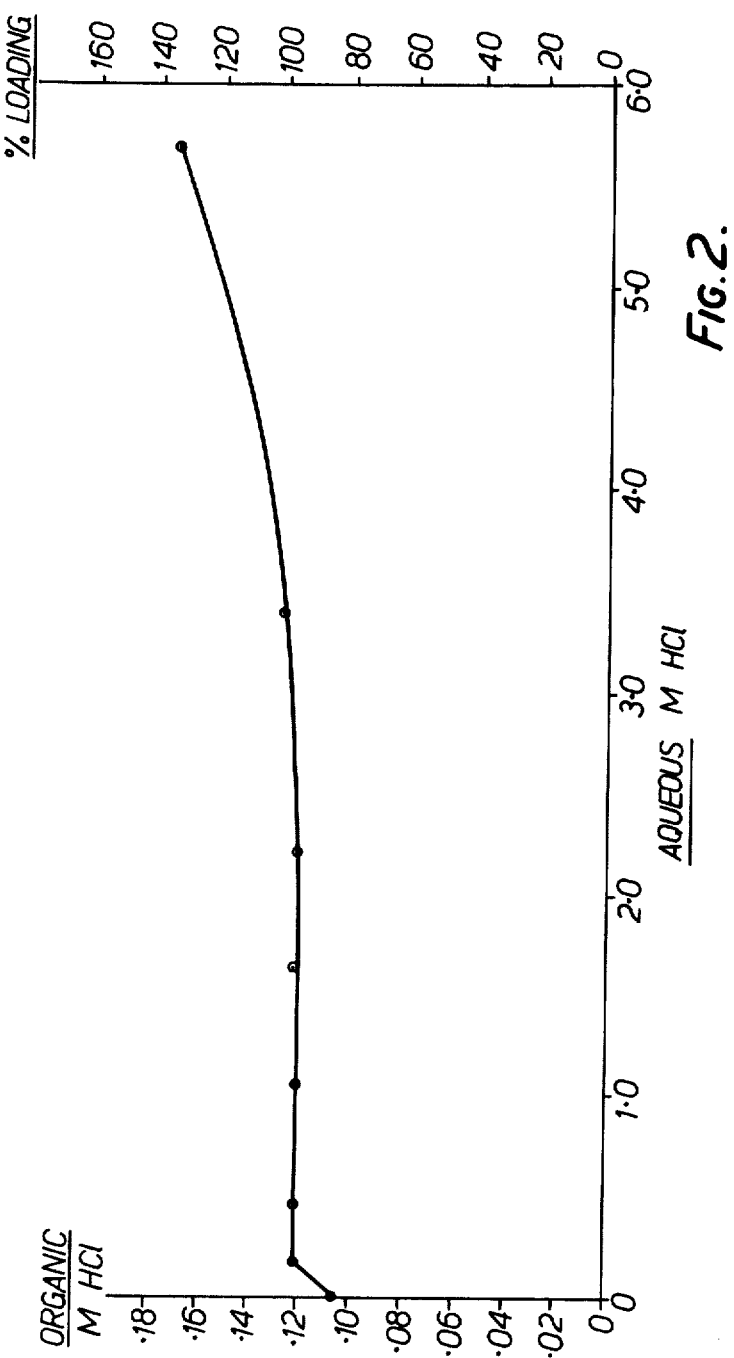
Figure 3:
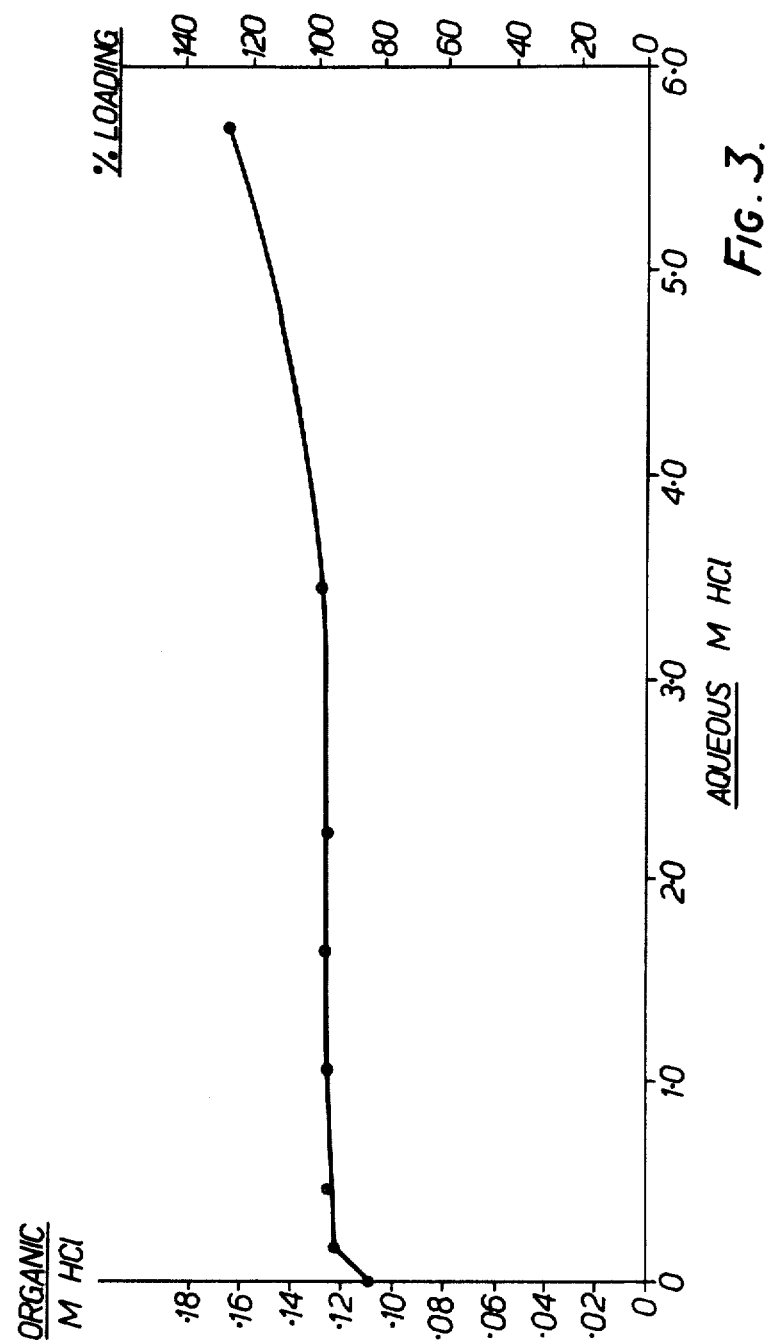

(FIGS. 1 to 3 are provided for comparison purposes only. HBCTP stands for hexakis-(n-butylamino)-cyclotriphosphazene, HHCTP for hexakis-(n-heptylamino)-cyclotriphosphazene, HPPCTP for n-heptylamino-pentaphenylcyclotriphosphazene, and BAHMCTS for (4-aminobutyl)-heptamethylcyclotetrasiloxane).

Each of these distribution curves was obtained by the following procedure.

Procedure for obtaining distribution curves

Equal volumes (0.5 ml) of the unloaded organic phase and aqueous acid of known concentration were contacted and agitated for a few minutes one with another. After phase separation 0.1 ml aliquots of the acid loaded organic phase were diluted with 0.5 ml of ethanol and titrated versus 0.1 M caustic soda using thymol blue as indicator. A stream of nitrogen was passed through the solution during titration. The acid concentration in the aqueous raffinate was calculated by difference. From these results the distribution curves of FIGS. 1 to 10 were plotted. In plotting these curves "% loading" is defined such that 100% loading of the organic phase corresponds to an amine:acid ratio of 1:1, whilst a 200% loading corresponds to an amine:acid ratio of 1:2 etc.

It will be noted from FIGS. 2 and 3 that, despite the fact that Alamine 336 (trioctylamine) is a monoamine, organic phase loadings in excess of 100% can be achieved. It is postulated that, although up to 100% loading an organic phase containing a monoamine ($\bar{A}$) extracts acid (HX) from aqueous solution by neutralisation according to the equation:

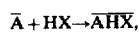

further acid extraction can occur by an addition reaction:

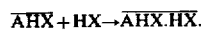

Thus a monoamine, such as Alamine 336, can load to 100% by neutralisation but higher loadings can be achieved due to addition. A similar phenomenon can be noted from FIG. 10, in which the monoamine is (4-aminobutyl)-heptamethylcyclotetrasiloxane. A polyamine containing Z amino groups can load to $(100 \times Z)\%$ by neutralisation and possibly even higher by addition.

Although different chemical species may be formed through neutralisation or addition this distinction is not necessarily apparent from the distribution curve which shows only the net overall extraction of acid. For example, if a diamine is loaded to more than 100%, it cannot be decided from the distribution curve whether this is due to (i) total neutralisation of a first amino group plus partial neutralisation of the second group, (ii) total neutralisation of a first amino group plus some addition but no neutralisation of the second amino group, or (iii) a situation somewhere between cases (i) and (ii) with total and partial neutralisation of both groups plus some addition.

The distribution curves of FIGS. 1 to 10 can be used in the design of an extraction plant to operate using the process of the present invention. This is illustrated with reference to FIG. 11 of the accompanying drawings, which is the distribution curve of FIG. 4 on which have been superimposed the lines necessary for making the calculation.

Figure 11:
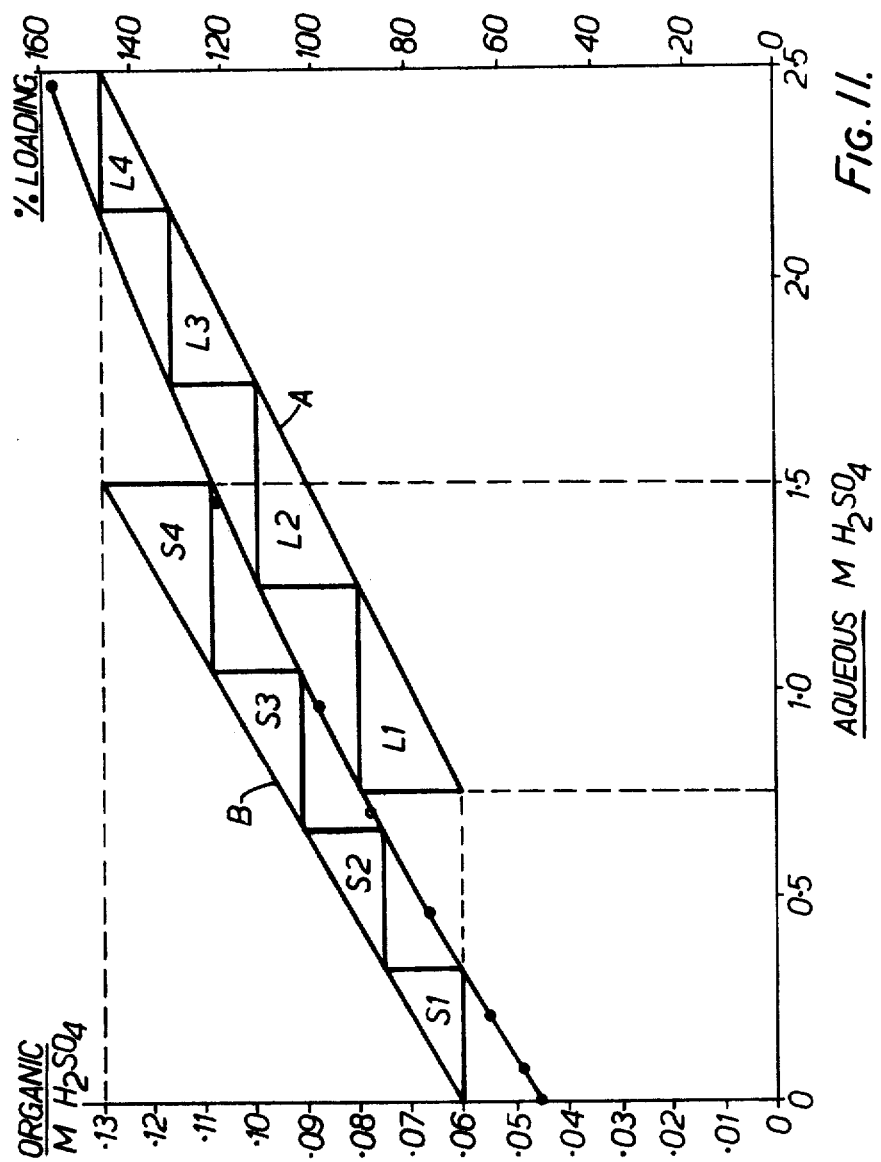

In FIG. 11 the loading step of the extraction process is accomplished in four theoretical stages (L1 to L4) by countercurrent extraction at an aqueous:organic phase ratio of 1:25 starting with an organic phase (i.e. 5.03% w/v HBCTP in 10.2% v/v iso-decanol in toluene) that is loaded to 0.06 M with $H_2SO_4$ and with an aqueous phase that is 2.5 M is $H_2SO_4$. The resulting loaded organic phase, after four theoretical stages, is loaded to 0.13 M with $H_2SO_4$ and the aqueous raffinate is now 0.75 M in $H_2SO_4$. Stripping is effected in four theoretical stages (S1 to S4) by countercurrent extraction against water at an aqueous:organic phase ratio of 1:21.43. The loaded organic phase is stripped from 0.13 M in $H_2SO_4$ to 0.06 M in $H_2SO_4$, whilst the aqueous sulphuric acid solution from the fourth stripping stage is 1.5 M in $H_2SO_4$. It will be observed from FIG. 11 that the slope of the loading line A corresponds to the aqueous:organic phase ratio (v/v) used during loading, whilst that of stripping line B corresponds to the organic:aqueous phase ratio (v/v) used during stripping.

Figure 5:
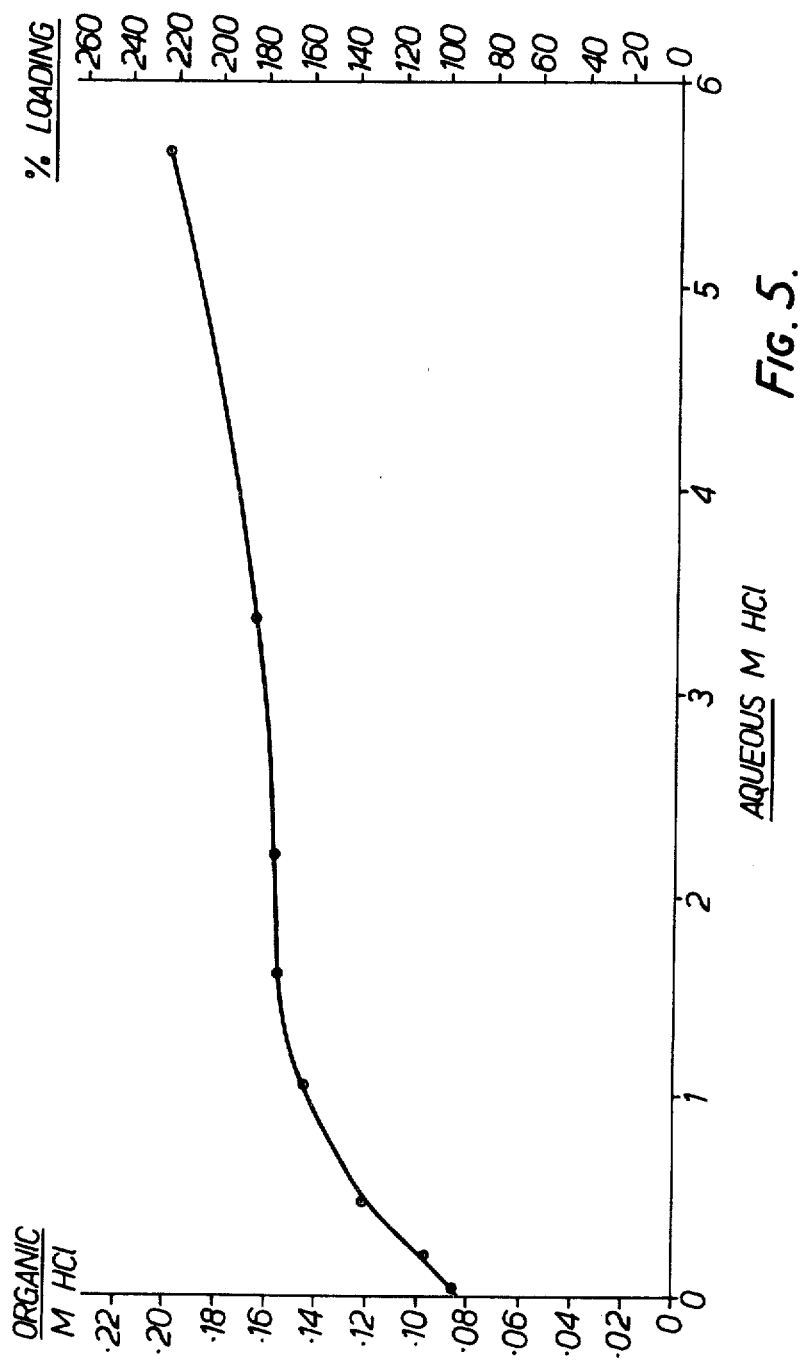
Figure 6:
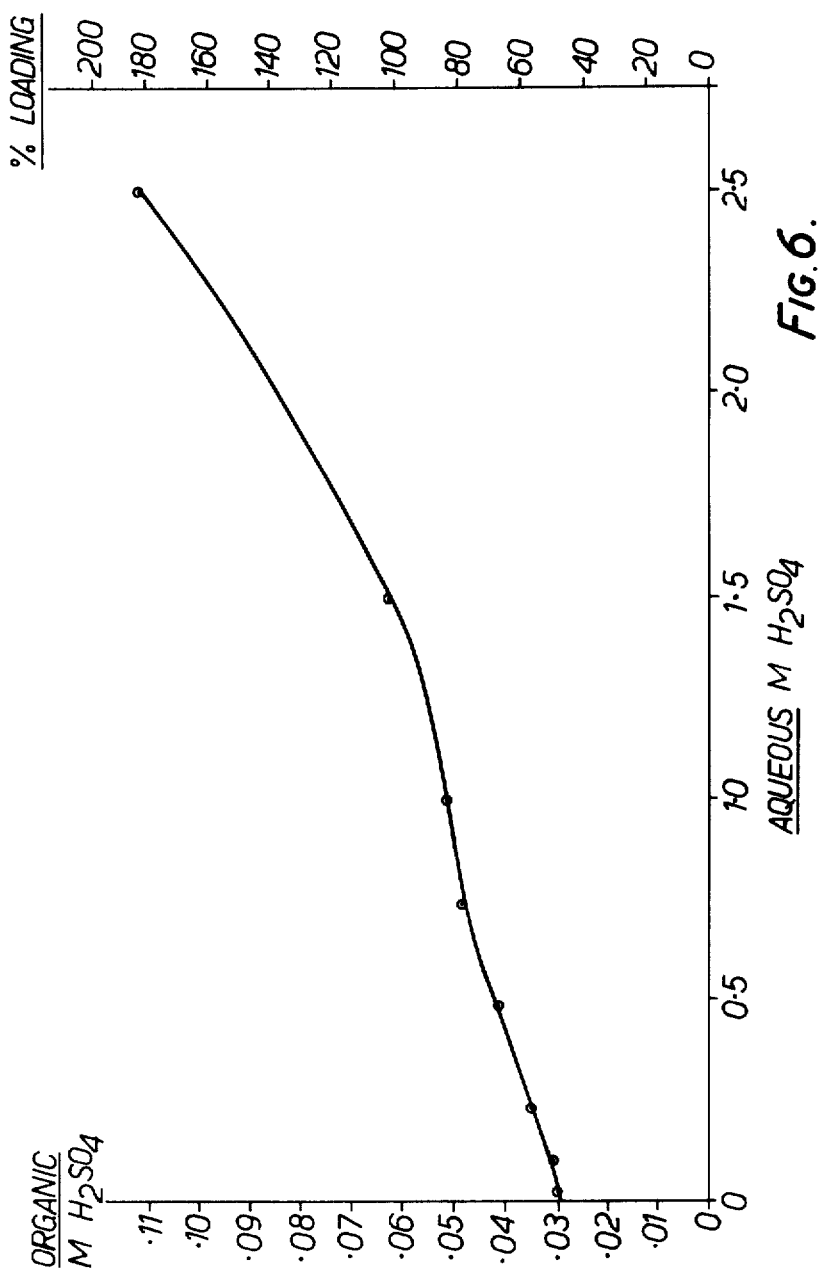
Figure 7:
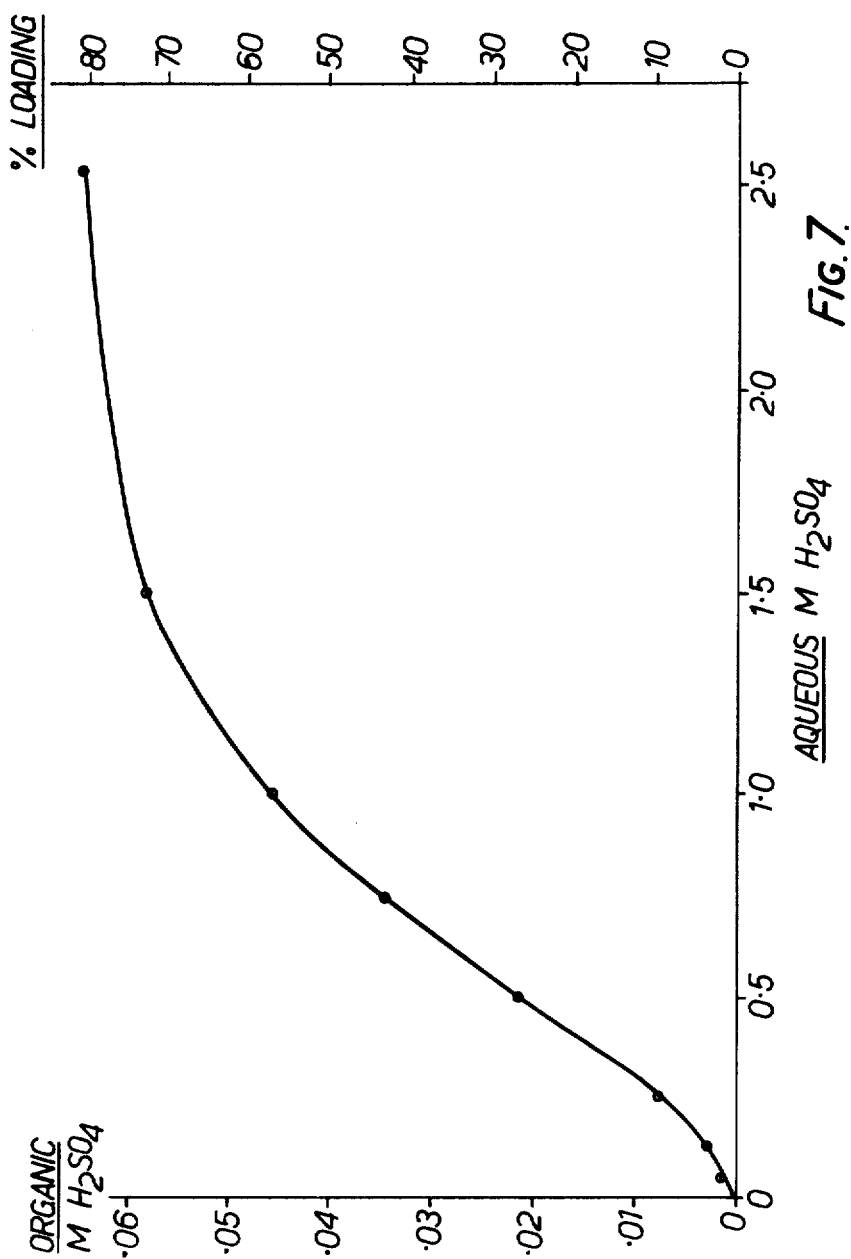
Figure 8:
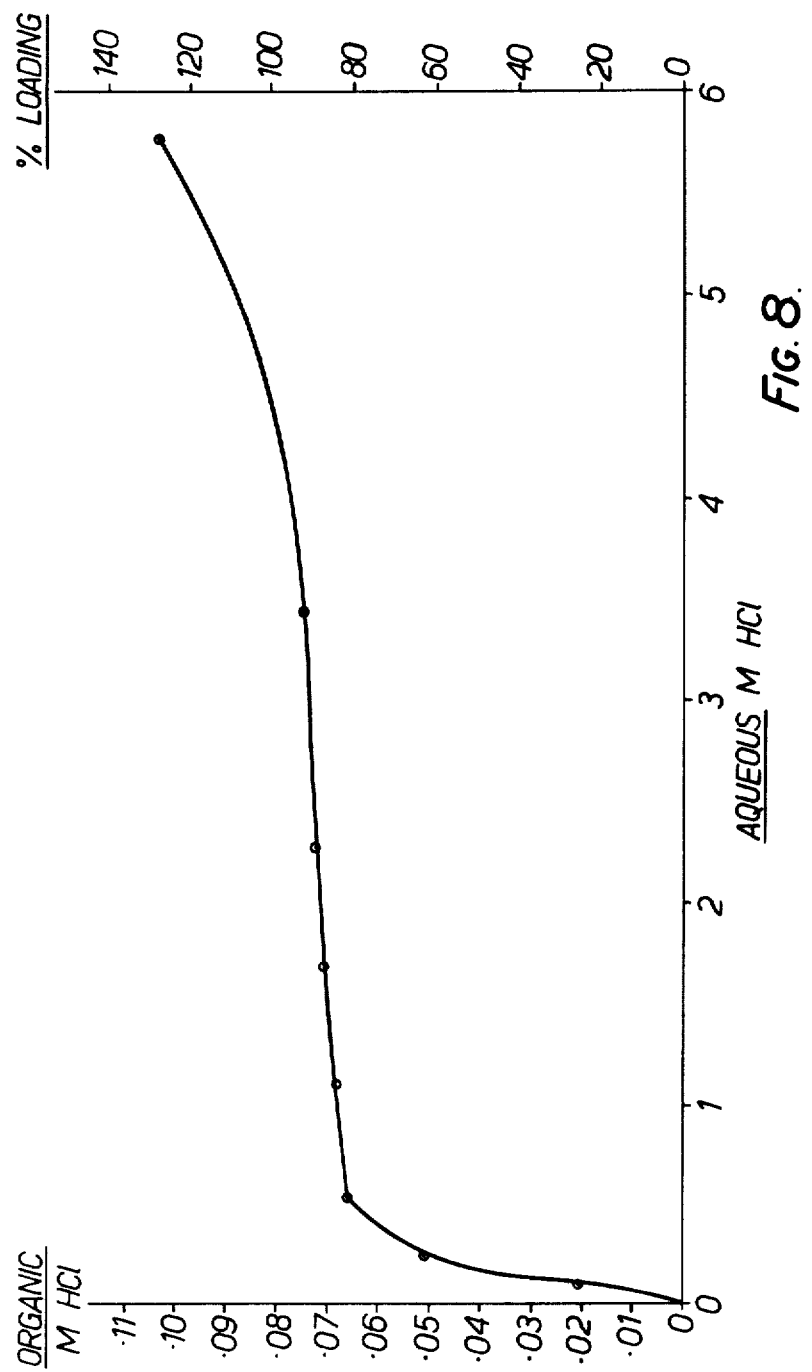
Figure 9:
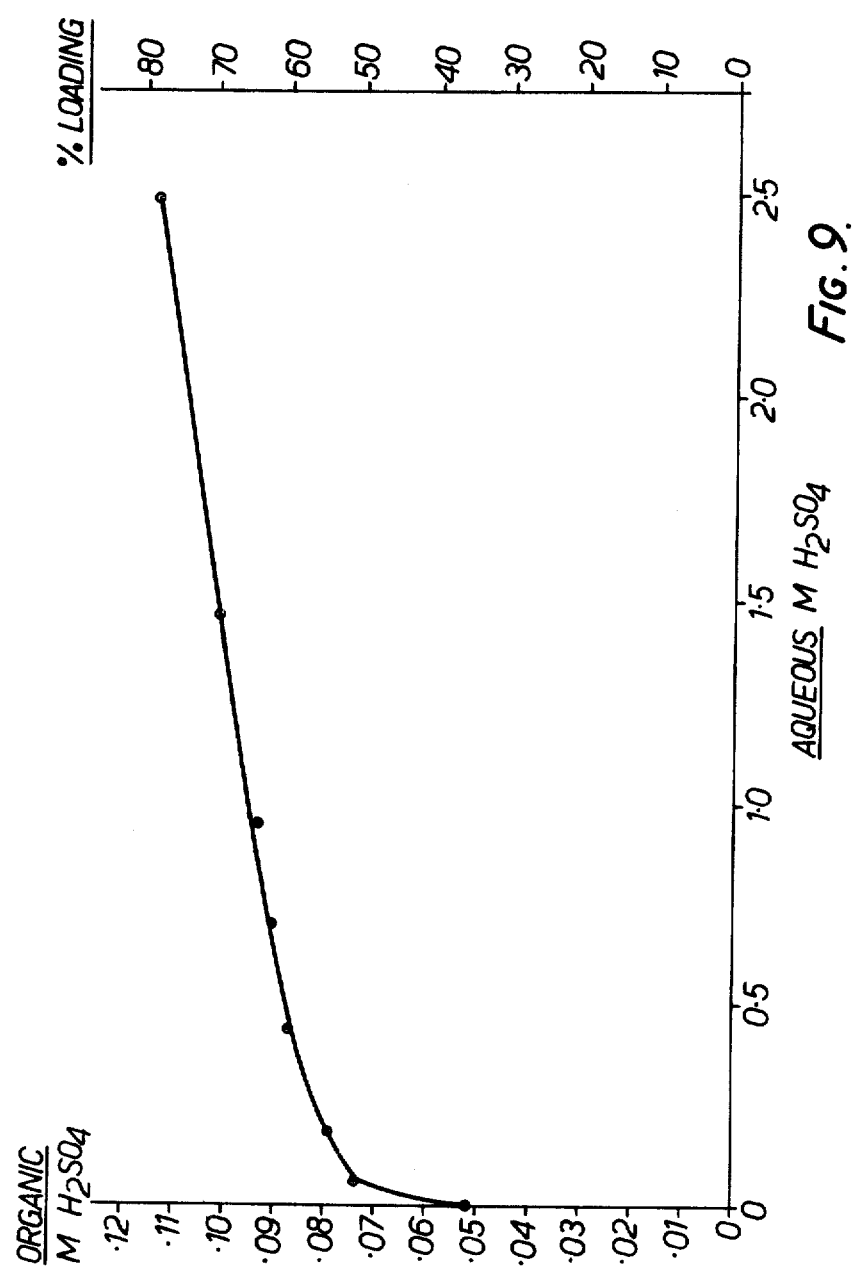
Figure 10:
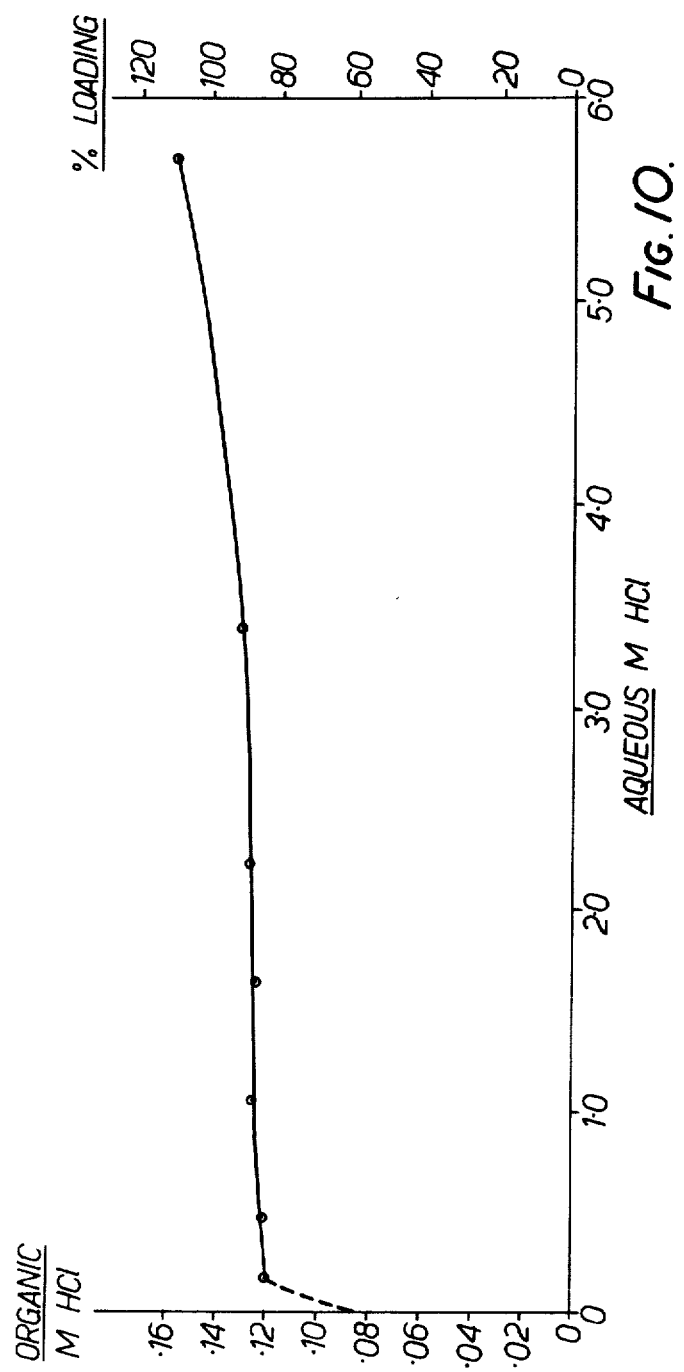

The results of these and other calculations based upon the distribution curves of FIGS. 1, 5 and 7 are summarised below in Table 1.

clotriphosphazene) is a weak base, it can be essentially completely stripped of acid during the stripping step. This means that, for a given concentration of extractant in the organic phase, essentially all of the extractant can be loaded in a cyclic extraction process. When using a strong base such as Alamine 336 or HBCTP, however, it is impracticable to strip all of the acid from the organic phase during the stripping step. Hence only part of the theoretically available capacity of the extractant present in the organic phase can be loaded in the extraction step in a cyclic extraction process.

Although the major component of the solvent used for preparing the distribution curves of FIGS. 4 to 10 (i.e. toluene) differs from that used for preparing the distribution curves of FIGS. 1 and 2 (i.e. Escaid 100), the close similarity between the curves of FIGS. 2 and 3 (which differ essentially only in the choice of solvent) indicates that the results of FIGS. 4 to 10 are directly comparable with those of FIGS. 1 to 3. Hence, when using Escaid 100 in place of toluene in preparing distribution curves with the bases used in FIGS. 4 to 10, similar results are obtained.

Figure 4:
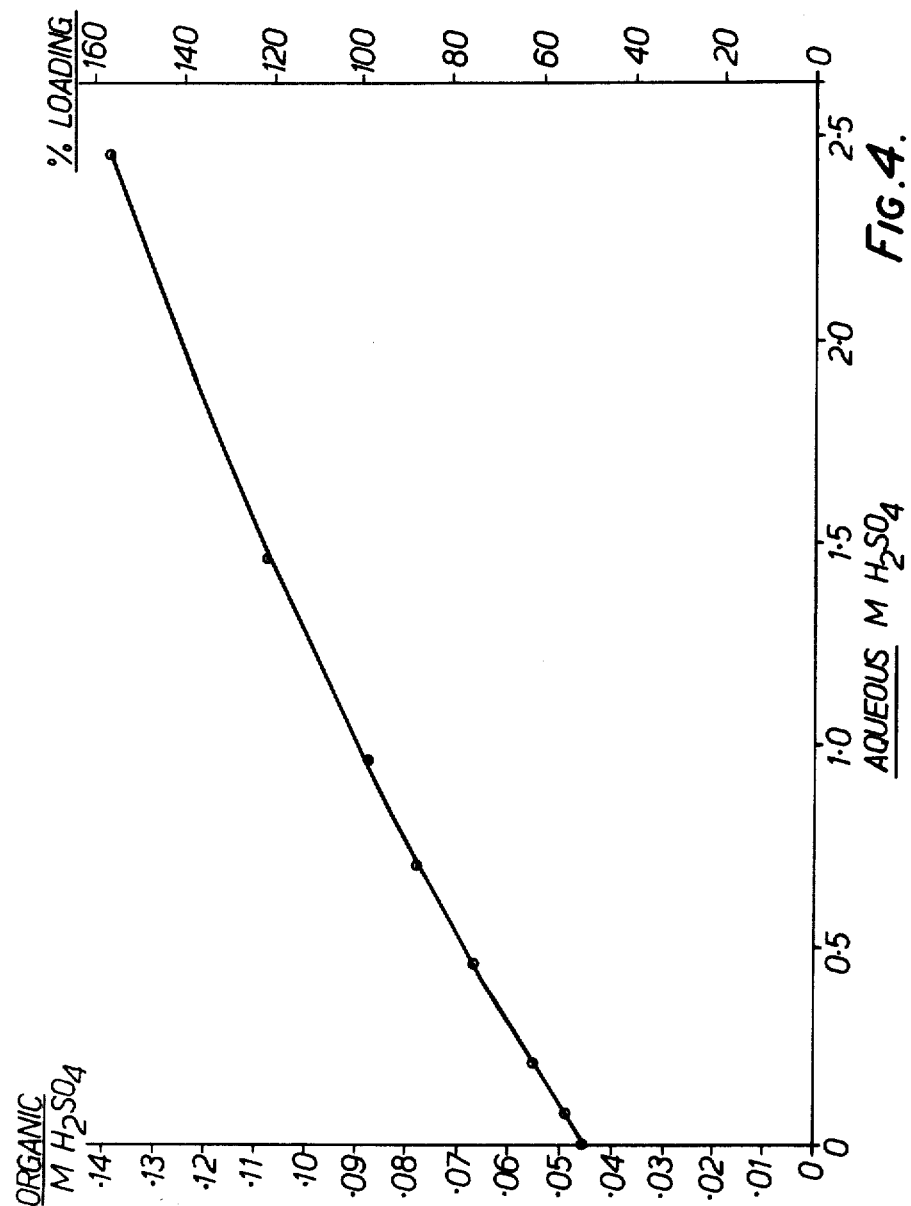

Using a conventional laboratory scale mixersettler apparatus arranged to effect continuous countercurrent extraction in four stages at an aqueous/organic phase ratio of 1:25, a solution of the compound HBCTP of the type used in preparing the distribution curve of FIG. 4 is used to extract a 2.5 M $H_2SO_4$ solution. The resulting loaded organic liquor is then stripped in the same apparatus with water at an aqueous/organic phase ratio of 1:21.43. Analysis of the loaded organic liquor, of the aqueous raffinate, of the stripped liquor, and of the

TABLE 1

| Calculation No. | 1 | 2 | 3 | 4 | 5 | 6 | 7 |
|---|---|---|---|---|---|---|---|
| FIG. No. | 4 | 1 | 4 | 1 | 7 | 5 | 5 |
| Organic phase: | HBCTP | Alamine 336 | HBCTP | Alamine 336 | HPPCTP | HBCTP | HBCTP |
| Reagent | | | | | | | |
| Aqueous phase | $H_2SO_4$ | $H_2SO_4$ | $H_2SO_4$ | $H_2SO_4$ | $H_2SO_4$ | HCl | HCl |
| Loading: | | | | | | | |
| No. of theoretical stages | 4 | 4 | 7 | 6 | 6 | 3 | 5 |
| Aq./organic phase ratio (v/v) | 1:25 | 1:43.75 | 1:28.13 | 1:45 | 1:39.58 | 1:50 | 1:60 |
| Initial org. loading | 0.06M | 0.08M | 0.05M | 0.07M | 0 | 0.12M | 0.14M |
| Final org. loading | 0.13M | 0.12M | 0.13M | 0.12M | 0.06M | 0.16M | 0.19M |
| Initial aq. concn. | 2.5M | 2.5M | 2.5M | 2.5M | 2.5M | 3M | 5.5M |
| Final aq. concn. | 0.75M | 0.75M | 0.25M | 0.25M | 0.125M | 1M | 2.5M |
| Stripping: | | | | | | | |
| No. of theoretical stages | 4 | 5 | 8 | 12 | 8 | 4 | 3 |
| Aq./organic phase ratio (v/v) | 1:21.43 | 1:37.5 | 1:18.75 | 1:30 | 1:16.67 | 1:31.25 | 1.60 |
| Initial org. loading | 0.13M | 0.12M | 0.13M | 0.12M | 0.06M | 0.16M | 0.19M |
| Final org. loading | 0.06M | 0.08M | 0.05M | 0.07M | 0 | 0.12M | 0.14M |
| Initial aq. concn. | 0 | 0 | 0 | 0 | 0 | 0 | 0 |
| Final aq. conc. | 1.50M | 1.50M | 1.50M | 1.50M | 1M | 1.25M | 3M |

It will be apparent to those skilled in the art from the distribution curves of FIGS. 1 to 10 that a practical extraction plant cannot be designed that utilises Alamine 336 for stripping sulphuric acid from aqueous solutions thereof to give results comparable to those of Calculation No. 5, nor for stripping HCl from aqueous solution to give results comparable to those of Calculations Nos. 6 and 7. Hence the compounds HBCTP and HPPCTP can be used in situations where it is impracticable to use the known monoamine extractant, Alamine 336 (trioctylamine).

Furthermore it should be noted that, although the compound HPPCTP (n-heptylamino-pentaphenylcyaqueous liquor from the stripping step yields results which confirm the correctness of Calculation No. 1 within experimental limits.

For use in a practical commercial extraction process the extractant phase is preferably so formulated that it is substantially insoluble in aqueous media. Preferably it is so formulated that less than about 20 p.p.m., and even more preferably less than about 10 p.p.m., of organic material dissolves in the aqueous phase from the extractant phase upon contact therewith.

Further examples of compounds of the formula (I) are listed in Table 2.

TABLE 2

| Compound No. | R₁ | R₂ | R₃ | R₄ | R₅ | R₆ |
|---|---|---|---|---|---|---|
| 1 | —CH₃ | —CH₃ | —CH₃ | —CH₃ | —CH₃ | —NHPh |
| 2 | —Ph | —Cl | —Ph | —Cl | —Ph | —Cl |
| 3 | —Ph | —Ph | —Ph | —Ph | —Ph | —Cl |
| 4 | —Ph | —Ph | —Ph | —Ph | —Ph | —NH(CH₂)₆CH₃ |
| 5 | —CH₃ | —CH₃ | —CH₃ | —CH₃ | —CH₃ | —NH(CH₂)₆CH₃ |
| 6 | —NHPh | —Br | —Ph | —Br | —Ph | —Br |
| 7 | —NHPh | —NHPh | —NHPh | —NHPh | —NHPh | —NHPh |
| 8 | —CH₃ | —CH₃ | —CH₃ | —CH₃ | —CH₃ | —NHCH₂CH₂NH₂ |
| 9 | —CH₃ | —CH₃ | —CH₃ | —CH₃ | —CH₃ | —CH₂CH₂NH₂ |
| 10 | —Ph | —Ph | —Ph | —Ph | —Ph | —Ph |
| 11 | —Ph | —NHCH₃ | —Ph | —NHCH₃ | —NHCH₃ | —NHCH₃ |
| 12 | —Ph | —NHCH₃ | —Ph | —NHCH₃ | —NHCH₃ | —NHCH₃ |
| 13 | —Ph | —N(CH₃)₂ | —Ph | —N(CH₃)₂ | —Ph | —N(CH₃)₂ |
| 14 | —Ph | —N(CH₃)₂ | —Ph | —N(CH₃)₂ | —N(CH₃)₂ | —N(CH₃)₂ |
| 15 | —Ph | —Ph | —Ph | —Ph | —Ph | —NH₂ |
| 16 | o-phenylenedioxy | | o-phenylenedioxy | | o-phenylenedioxy | |
| 17 | 1,8-naphthylenedioxy | | 1,8-naphthylenedioxy | | 1,8-naphthylenedioxy | |
| 18 | —OPh | —OPh | —OPh | —OPh | —OPh | —OPh |
| 19 | p-tolyloxy | p-tolyloxy | p-tolyloxy | p-tolyloxy | p-tolyloxy | p-tolyloxy |
| 20 | —Ph | —OCH₂CH₂NMe₂ | —Ph | —OCH₂CH₂NMe₂ | —Ph | —OCH₂CH₂NMe₂ |
| 21 | —SPh | —SPh | —SPh | —SPh | —SPh | —SPh |
| 22 | —S—n-C₄H₉ | —S—n-C₄H₉ | —S—n-C₄H₉ | —S—n-C₄H₉ | —S—n-C₄H₉ | —S—n-C₄H₉ |
| 23 | —CH₃ | —CH₂Ph | —CH₃ | —CH₂Ph | —CH₃ | —CH₂Ph |
| 24 | —CH₃ | —p-C₆H₄—NH₂ | —CH₃ | —p-C₆H₄—NH₂ | —CH₃ | —p-C₆H₄—NH₂ |
| 25 | —SCH₂Ph | —Ph | —SCH₂Ph | —Ph | —SCH₂Ph | —Ph |
| 26 | —Ph | N—morpholino- | —Ph | N—morpholino- | —Ph | N—morpholino- |
| 27 | p-NO₂—C₆H₄— | p-NO₂—C₆H₄— | p-NO₂—C₆H₄— | —Br | p-NO₂—C₆H₄— | —Br |
| 28 | —Ph | —NH₂ | —Ph | —NH₂ | —Ph | —NH₂ |
| 29 | —Ph | —NHNH₂ | —Ph | —NHNH₂ | —Ph | —NHNH₂ |
| 30 | —NHPh | —CH₂CH₂OCOCH₃ | —NHPh | —CH₂CH₂OCOCH₃ | —NHPh | —CH₂CH₂OCOCH₃ |
| 31 | —OCH₂CF₃ | —OCH₂CF₃ | —OCH₂CF₃ | —OCH₂CF₃ | —OCH₂CF₃ | —OCH₂CF₃ |
| 32 | p-tolylene-1,2-dithio | | p-tolylene-1,2-dithio | | p-tolylene-1,2-dithio | |
| 33 | naphthylene-2,3-dioxy | | naphthylene-2,3-dioxy | | naphthylene-2,3-dioxy | |
| 34 | —O—CH₂—CH₂—O— | | —O—CH₂—CH₂—O— | | —O—CH₂—CH₂—O— | |
| 35 | —S—C(=NH)—C(=NH)—S— | | —S—C(=NH)—C(=NH)—S— | | —S—C(=NH)—C(=NH)—S— | |
| 36 | —Ph | —N(=CH₂)₂ | —Ph | —N(=CH₂)₂ | —Ph | —N(=CH₂)₂ |
| 37 | —F | —N(CH₃)₂ | —F | —N(CH₃)₂ | —F | —N(CH₃)₂ |
| 38 | —OCH₂CH₃ | —NHCH₃ | —OCH₂CH₃ | —NHCH₃ | —OCH₂CH₃ | —NHCH₃ |
| 39 | —OCH₂CH₂OMe | —NHCH₃ | —OCH₂CH₂OMe | —NHCH₃ | —OCH₂CH₂OMe | —NHCH₃ |
| 40 | —CH₂CH₂OEt | —NHCH₃ | —CH₂CH₂OEt | —NHCH₃ | —CH₂CH₂OMe | —NHCH₃ |
| 41 | —Ph | —NHNHCH₃ | —Ph | —NHNHCH₃ | —Ph | —NHNHCH₃ |
| 42 | —Ph | —N(CH₃)NH₂ | —Ph | —N(CH₃)NH₂ | —Ph | —N(CH₃)NH₂ |
| 43 | —OCH₂Ph | —OCH₂Ph | —OCH₂Ph | —OCH₂Ph | —OCH₂Ph | —OCH₂Ph |
| 44 | —CH₂CH₂SMe | —NHCH₃ | —CH₂CH₂SMe | —NHCH₃ | —CH₂CH₂SMe | —NHCH₃ |
| 45 | —OCH₂CH₂SMe | —OCH₂CH₂SCH₃ | —OCH₂CH₂SMe | —OCH₂CH₂SCH₃ | —OCH₂CH₂SMe | —OCH₂CH₂SMe |
| 46 | —CH₂CH₂SPh | —CH₂CH₂SPh | —CH₂CH₂SPh | —CH₂CH₂SPh | —OCH₂CH₂SPh | —CH₂CH₂SPh |
| 47 | —CH₃ | —O—m-C₆H₄—NH₂ | —CH₃ | —O—m-C₆H₄—NH₂ | —CH₃ | —O—m-C₆H₄—NH₂ |
| 48 | —CH₃ | —NHCH₃ | —CH₃ | —NHCH₃ | —(CH₂)₃—Q* | —NHCH₃ |

Note:
*Q = (4-aminobutyl)-heptamethylcyclotetrasiloxanyl.

Listed below in Table 3 are examples of compounds of the formula (II)

TABLE 3

| Compound No. | $R_1$ | $R_2$ | $R_3$ | $R_4$ | $R_5$ | $R_6$ | $R_7$ | $R_8$ |
|---|---|---|---|---|---|---|---|---|
| 49 | —CH$_3$ | —NHPh | CH$_3$ | —NHPh | —CH$_3$ | NHPh | —CH$_3$ | —NHPh |
| 50 | —CH$_3$ | —CH$_3$ | CH$_3$ | —CH$_3$ | —CH$_3$ | —CH$_3$ | —CH$_3$ | —NH—n-C$_4$H$_9$ |
| 51 | —Ph | —NHCH$_3$ | Ph | —NHCH$_3$ | —Ph | —NHCH$_3$ | —Ph | —NHCH$_3$ |
| 52 | —Ph | —N(CH$_3$)$_2$ | Ph | —N(CH$_3$)$_2$ | —Ph | —N(CH$_3$)$_2$ | —Ph | —N(CH$_3$)$_2$ |
| 53 | —Ph | —NH$_2$ | Ph | —NH$_2$ | —Ph | —NH$_2$ | —Ph | —NH$_2$ |

Using the methods outlined above distribution curves for the compounds listed in Tables 2 and 3 are readily obtainable.

The invention is further illustrated in the following Examples in which concentrations are expressed in terms of anhydrous materials.

EXAMPLE 1

An organic hydrophobic liquid extractant phase was prepared containing 5.02% w/v hexakis-(n-butylamino)-cyclotriphosphazene (HBCTP) dissolved in a mixed iso-decanol/toluene solvent containing 10.06% w/v iso-decanol. A uranium-containing aqueous feed solution was also prepared containing 44 gpl ammonium sulphate, 1.18 gpl uranium and sufficient sulphuric acid to bring the pH of the solution to 1.04.

Equal volumes of the two solutions were shaken together for about 5 minutes and then allowed to settle and separated. Analysis of the organic layer indicated that the uranium concentration therein was 0.87 gpl, whilst the uranium concentration of the aqueous layer was shown by analysis to be 0.34 gpl. Thus, under the conditions used the distribution coefficient, i.e. equilibrium concentration of U in organic phase: equilibrium concentration of U in aqueous phase, was 2.56.

Upon shaking the uranium-loaded organic layer with 5 times its volume of 80 gpl aqueous sodium carbonate solution, essentially all the uranium was stripped from the organic phase into the aqueous stripping solution.

The lean organic liquor from the stripping stage can be re-loaded with uranium by shaking with a fresh volume of the aqueous feed solution and re-stripped showing that the HBCTP extractant can be used repeatedly in a cyclic process.

EXAMPLE 2

A cobalt-containing aqueous feed solution was prepared containing 250 gpl free hydrochloric acid and 22.4 gpl cobalt. The same organic phase that was used in Example 1 was also used in this Example.

Equal volumes of the solutions were shaken together for about 5 minutes and then allowed to settle and separated. Upon analysis it was shown that the equilibrium cobalt concentration was 4.1 gpl in the loaded organic phase and 18.3 gpl in the aqueous phase. The distribution coefficient under these conditions was 0.22. The cobalt loading of the HBCTP extractant in the organic phase was 87%.

The cobalt-loaded organic phase was stripped by shaking with 10 times its volume of water.

The lean organic liquor can be loaded again with cobalt by shaking with a fresh volume of the cobalt-containing aqueous feed solution and re-stripped again, thus showing that the HBCTP extractant can be used repeatedly in a cyclic process.

We claim:

1. In an extraction process for extracting ionic values from an aqueous solution containing same, said process comprising first contacting said aqueous solution with an organic hydrophobic liquid extractant phase comprising an extractant for said ions to form a loaded extractant phase, and thereafter stripping said ions from said loaded extractant phase with an aqueous stripping liquid phase, the improvement comprising using, as said extractant, an at least substantially water-insoluble extractant, the molecules of which contain at least one hydrophobic group selected from the group consisting of cyclic phosphazene radicals, linear siloxane radicals, cyclic siloxane radicals, and three-dimensional siloxane radicals.

2. A process according to claim 1, wherein said extractant is an extractant for anions, and comprises a cyclic phosphazene which is substituted by at least one non-water-solubilizing substituent selected from the group consisting of halogen, nitro, alkyl, alkoxy, alkylsulphonyl, alkoxycarbonyl, alkylcarbonyloxy, alkylcarbonyl, aryl, and cyano substituents.

3. A process according to claim 2, in which the cyclic phosphazene comprises a cyclotriphosphazene or a cyclotetraphosphazene or a mixture thereof.

4. A process according to claim 3, in which the extractant comprises a compound of the formula:

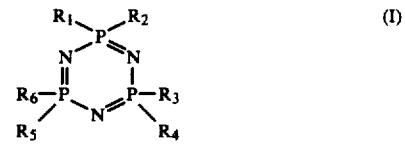

(I)

or of the formula:

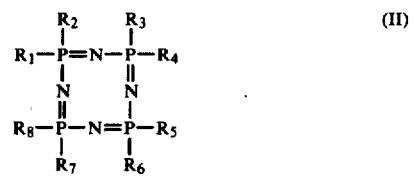

(II)

or a mixture thereof, wherein each of $R_1$ to $R_8$, independently of the others, is selected from halogen, alkyl, alkoxy, aryl, aryloxy, alkylthio, arylthio, —NR$_9$R$_{10}$, alkoxyalkylene, alkoxyalkyleneoxy, —NHNR$_9$R$_{10}$, —NR$_9$NHR$_{10}$, arylalkyl, arylalkoxy, alkylthioalkylene, alkylthioalkyleneoxy, arylthioalkylene, R$_9$R$_{10}$N-alkylene, R$_9$R$_{10}$N-alkyleneoxy, R$_9$R$_{10}$N-arylene, R$_9$R$_{10}$N-aryleneoxy, and siloxanyl-alkylene radicals, or wherein at least one of the pairs of radicals $R_1$ and $R_2$, $R_3$ and $R_4$, and $R_5$ and $R_6$ together represent the atoms which are required to complete, together with the P-atom to which they are attached, a 5-, 6- or 7-membered saturated or unsaturated, substituted or unsubstituted heterocyclic ring, wherein each of $R_9$ and $R_{10}$, independently of the other, is selected from hydrogen atoms, alkyl radicals and aryl radicals or $R_9$ and $R_{10}$ together represent the atoms which are required, together with the N-atom to which they are attached, to form a 3-, 4-, 5-, 6- or 7-membered, saturated or unsaturated, substituted or unsubstituted heterocyclic ring, and wherein each of the aforementioned alkyl, alkoxy, alkylene, aryl and siloxanyl radicals are unsubstituted or are substituted by at least one said non-water-solubilising substituent, provided that $R_9$ to $R_{10}$ are so selected that the compound of formula (I) or (II) is substantially water-insoluble.

5. A process according to claim 4, in which the extractant comprises a compound of formula (I) wherein at least one of the radicals $R_1$ to $R_6$ is an alkylamino radical and each of any remaining radicals $R_1$ to $R_6$, is an alkyl group.

6. A process according to claim 5, in which the extractant comprises hexakis-(n-butylamino)-cyclotriphosphazene.

7. A process according to claim 5, in which the extractant comprises hexakis-(n-heptylamino)-cyclotriphosphazene.

8. A process according to claim 7, in which the extractant comprises n-heptylamino-pentaphenylcyclotriphosphazene.

9. A process according to claim 5, wherein said alkylamino radical is an n-hexyl amino radical.

10. A process according to claim 4, in which the extractant comprises a compound of formula (I) wherein at least one of the radicals $R_1$ to $R_6$ is a phenyl radical and each of any remaining radicals $R_1$ to $R_6$, is an alkylamino radical.

11. A process according to claim 1, in which the extractant is an extractant for anions and comprises at least one primary, secondary, or tertiary amino group linked by a divalent organic radical to a linear, cyclic or three-dimensional siloxane radical.

12. A process according to claim 1, in which the extractant comprises a compound of the formula A-X-B wherein A represents $-NH_2$, $-NHR'$, or $-NR'R''$ wherein $R'$ and $R''$ each, independently of the other, represent an unsubstituted or substituted hydrocarbon radical or $R'$ and $R''$ together represent the atoms necessary, together with the N-atom to which they are attached, for forming an optionally substituted heterocyclic ring, X represents a divalent radical and B represents a three-dimensional siloxane radical or a radical of the formula

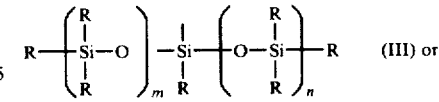 (III) or

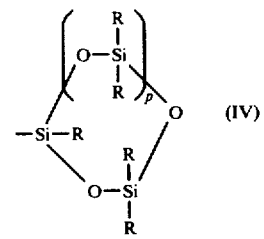 (IV)

wherein each R, independently of the others, represents alkyl or phenyl, m and n each represent 0 or an integer and p represents an integer of from 1 to about 6.

13. A process according to claim 12, in which the extractant comprises a compound of the formula A-X-B wherein -X- represents an alkylene radical.

14. A process according to claim 13, in which the extractant comprises (4-aminobutyl)-heptamethylcyclotetrasiloxane.

15. A process according to claim 1, in which the extractant is an extractant for metal ions and comprises at least one metal ion complexing group linked by means of a divalent radical to a hydrophobic group selected from linear siloxane radicals, cyclic siloxane radicals, and three-dimensional siloxane radicals.

16. A process according to claim 15, in which the extractant comprises a compound of the formula E-Y-F wherein E represents a metal ion complexing group, Y represents a divalent organic radical and F represents a three-dimensional siloxane radical or a radical of the formula (III) or (IV) as defined in claim 11.

17. A process according to claim 16, in which the extractant comprises a compound of the formula E-Y-F wherein -Y- represents an alkylene radical.

18. A process according to claim 16 in which the extractant comprises a compound of the formula:

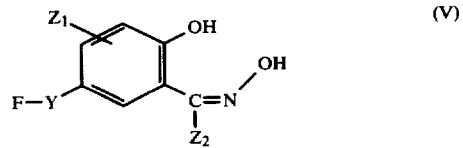 (V)

wherein F represents a radical of the formula (III) or (IV) as defined in claim 11, -Y- represents alkylene of from 1 to about 20 carbon atoms, $Z_1$ represents hydrogen or a said non-water-solubilising substituent, and $Z_2$ represents an alkyl or cyclic aromatic radical which is unsubstituted or substituted by at least one non-water-solubilising substituent selected from the group consisting of halogen, nitro, alkyl, alkoxy, alkylsulphonyl, alkoxycarbonyl, alkylcarbonyloxy, alkylcarbonyl, aryl, and cyano substituents.

* * * * *